(12) United States Patent
Knight

(10) Patent No.: US 8,096,849 B2
(45) Date of Patent: Jan. 17, 2012

(54) RATTLE STICK FOR ATTRACTING ANIMALS

(76) Inventor: William L. Knight, Centerville, IA (US)

( * ) Notice: Subject to any disclaimer, the term of this patent is extended or adjusted under 35 U.S.C. 154(b) by 1582 days.

(21) Appl. No.: 11/306,674

(22) Filed: Jan. 6, 2006

(65) Prior Publication Data

US 2007/0178802 A1    Aug. 2, 2007

(51) Int. Cl.
*A63H 5/00*    (2006.01)
(52) U.S. Cl. ........................................ 446/397; 446/421
(58) Field of Classification Search ................... 446/421, 446/208, 207, 178, 418, 419
See application file for complete search history.

(56) References Cited

U.S. PATENT DOCUMENTS

| 5,158,494 A | 10/1992 | Ball |
| 5,334,074 A | 8/1994 | Suminski |
| 6,042,447 A * | 3/2000 | Thompson ..................... 446/193 |
| 6,106,357 A * | 8/2000 | Weiser ........................... 446/207 |

* cited by examiner

*Primary Examiner* — Gene Kim
*Assistant Examiner* — Michael Dennis
(74) *Attorney, Agent, or Firm* — Zarley Law Firm, P.L.C.

(57) ABSTRACT

A rattle stick having an elongated member with an outwardly extending flange at one end and a handle at the opposite end. On the outer surface of the elongated member is at least one knob. Slidably fitted over the elongated member is a sleeve having at least one knob on an inner surface that is positioned to engage at least one knob on the outer surface of the member.

5 Claims, 3 Drawing Sheets

RATTLE STICK FOR ATTRACTING ANIMALS

BACKGROUND OF THE INVENTION

The invention is directed to a device for attracting animals, and more specifically is directed to a rattling stick that creates the sound of two bucks engaged in battle.

Rattling devices for attracting animals are known in the art. For example, some hunters will carry antlers into the field to create the sound of two bucks battling. While this creates a realistic sound, the antlers are cumbersome to transport and potentially can injure fingers when knocked against one another.

Other device have been used such as plastic antlers, a rattle bag having sticks that are rolled to make sound, and a rattle box where one runs their hand over the box. The quality of the sound produced by these devices is not as good and leading to less effective results. Accordingly, there exists a need in the art for a device that addresses these deficiencies.

An objective of this invention is to provide a rattle stick that is easier to transport Another object of the present invention is to provide a rattle stick that creates a more realistic sound of bucks battling.

A still further objective is to provide a rattle stick made of fewer parts, that is easy to assemble, and economical to manufacture.

These and other objectives will be apparent to those skilled in the art based on the following written description and claims.

SUMMARY OF THE INVENTION

A rattle stick having an elongated member with an outwardly extending flange at one end and a handle at the opposite end. On the outer surface of the elongated member is at least one knob. Slidably fitted over the elongated member is a sleeve having at least one knob on an inner surface that is positioned to engage at least one knob on the outer surface of the member.

DETAILED DESCRIPTION OF THE PREFERRED EMBODIMENT

Figure 1:
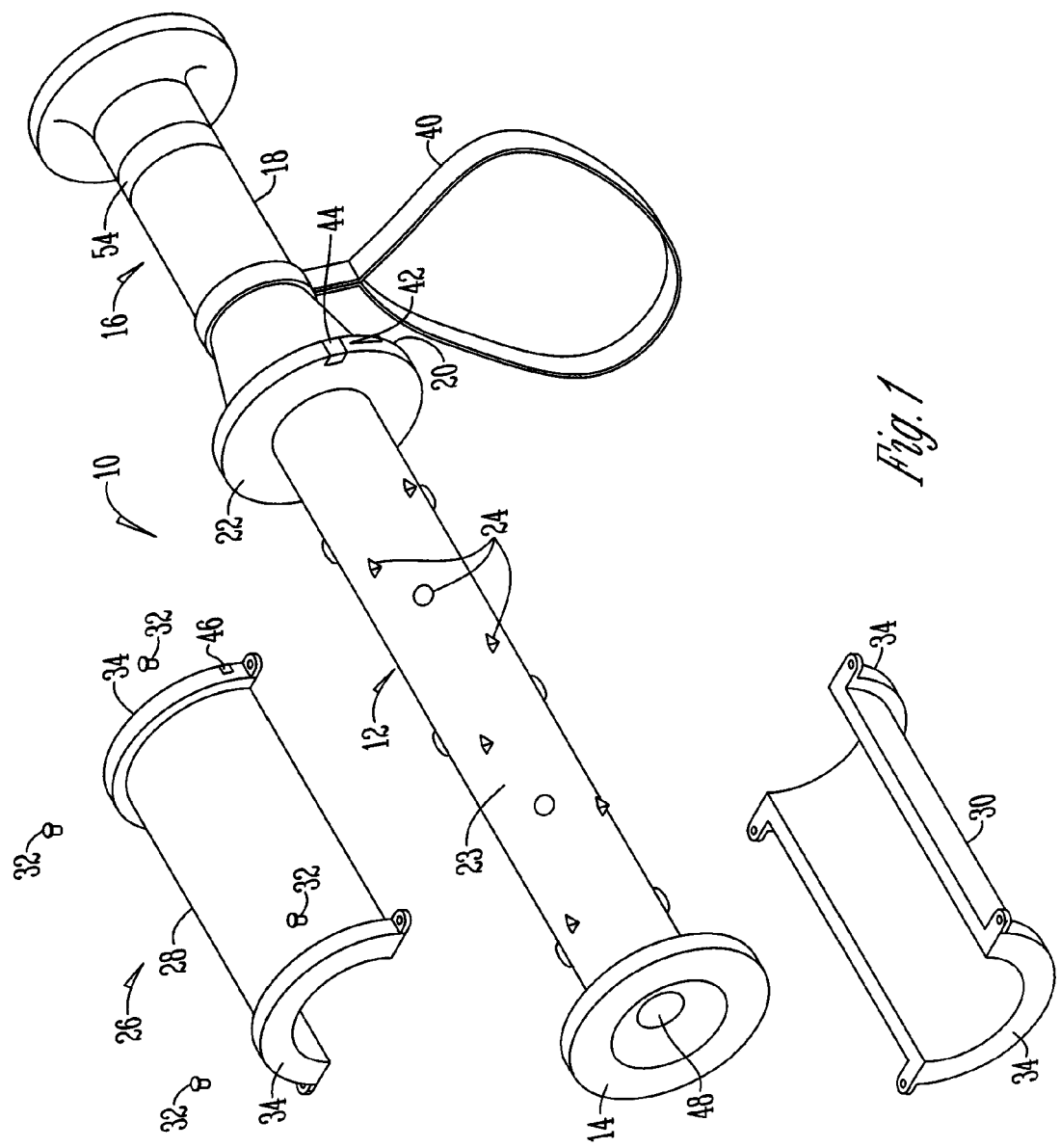
FIG. 1 is a perspective view of a rattle stick.
Figure 2:
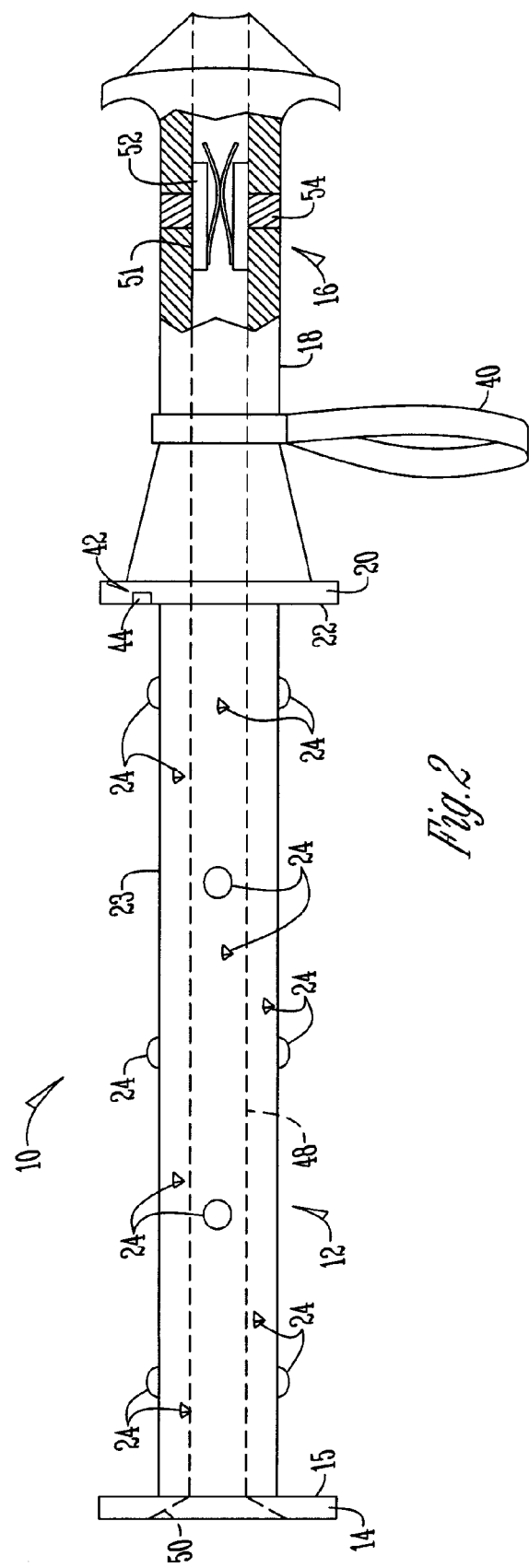
FIG. 2 is a side view of a rattle stick.
Figure 3:
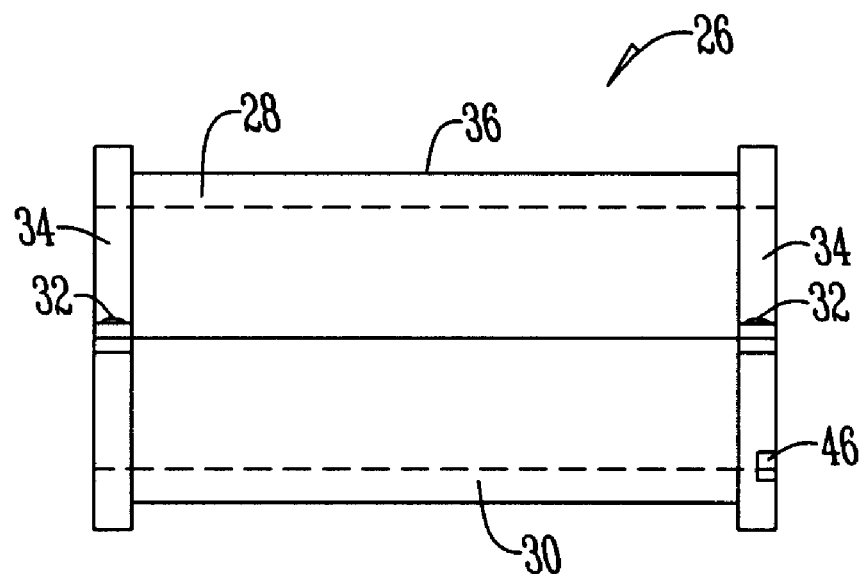
FIG. 3 is a side view of a sleeve of a rattle stick.
Figure 4:
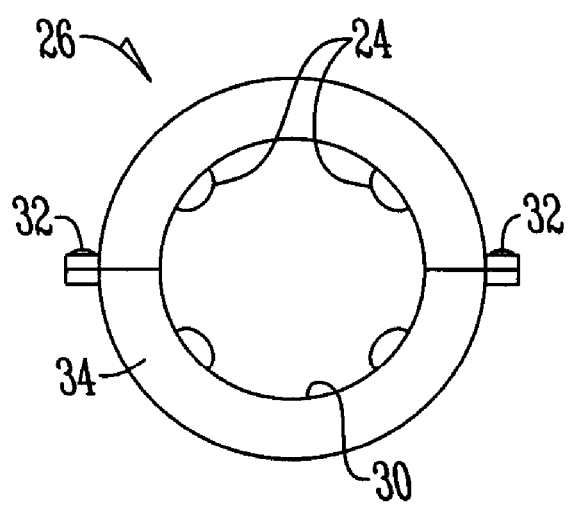
FIG. 4 is an end view of a sleeve of a rattle stick.

Referring to the figures the rattle stick 10 has an elongated member 12 with a flange 14 extending outwardly at one end of the member 12 and forms a first shoulder 15 and a handle 16 with a gripping portion 18 at the opposite end of the member 12. Preferably, the handle 16 tapers outwardly from the gripping portion 18 and terminates in an outwardly extending flange 20 that forms a second shoulder 22.

On the outer surface 23 of the elongated member 12 is at least one, and preferably many, knobs 24. The knobs 24 are of any shape and height such as square, rounded, triangular, or the like. In one embodiment the knobs are spring loaded. Alternatively, the knobs 24 are annular and extend around the outer surface 23 of the member 12 to form ribs.

Slidably mounted to the elongated member 12 is a sleeve 26. While the sleeve 26 is of any shape and construction, preferred is a sleeve 26 having two arcuate sections 28, 30 that abut one another and lay flush in relation to one another. The two sections are loosely connected by screws 32 that allow sufficient play such that the sections 28, 30 may separate from one another. For gripping purposes, the sleeve has a lip 34 at each end that extends outwardly from the gripping portion 36 of the sleeve. On the inner surface 38 of the sleeve 26 is at least one, and preferably many, knob(s) 24 that are positioned to engage the knobs 24 on the outer surface 23 of member 12. The length of the sleeve 26 is less than the distance between the first shoulder 15 and the second shoulder 22 to provide for adequate throw. In one example, the rattle stick is approximately 12.5 inches with a distance, or throw, between the first shoulder 15 and the second shoulder 22 of 7.5 inches, and a sleeve of 5 inches.

In operation, one grasps the gripping portion 18 of the handle 16 with one hand and lightly grasps the gripping portion 36 of the sleeve 26 with the other or second hand. By quickly sliding the sleeve 26 along the member 12 one can create a click or pop sound as the lip 34 engages the first shoulder 15 of flange 14. Additional sounds, similar to two bucks fighting are created by twisting or grinding the sleeve 26 bout the member 12. The rattle stick 10, because of its size is easily transported and can be carried in a holster, pocket, or fanny pack. Alternatively, a lanyard, sling, or rope 40 is attached to the handle 16. To prevent the rattle stick 10 from making noise during transport a latching mechanism 42 is used to maintain the sleeve in a stationary position. For example, a magnet with a polar surface is disposed within flange 20 and a second magnet 46 having an attracting polar surface is disposed in lip 34 such that when in abutment the magnets will maintain the sleeve 26 in a stationary position. Alternatively, flange 20 has a groove that receives a portion of lip 34 such that when lip 34 engages the groove and the sleeve 26 is twisted the lip 34 is retained in the groove.

While the rattle stick 10 is made as a stand alone unit, it also can be fitted to provide the combined functions of a grunt tube. Specifically, a bore 48 extends from one end of member 12, through the member 12 to the opposite end. Preferably, the bore 48 has a portion 50 that tapers outwardly within flange 14 to amplify the sound. Within the handle 16, the bore 48 has a section 51 that receives a grunt tube reed insert 52. Positioned on the handle 16 is a compressible section 54, such as a foam ring or the like that is adjacent to and in communication with bore section 51 that permits a user to engage the reed insert by compressing section 54 to alter the pitch of the grunt tube when a user blows in the handle end of the insert.

Thus, a rattle stick that at the very least meets all the stated objectives has been shown.

What is claimed is:

1. A rattle stick for attracting animals comprising:
   an elongated member having at least one knob on an outer surface, and
   a sleeve that fits over the elongated member and has at least one knob on an inner surface that engages the knob on the outer surface of the elongated member when the sleeve is moved over the elongated member;
   a bore extending through the elongated member from one end to the opposite end
   wherein the elongated member has a handle at one end;
   wherein the handle has an outwardly extending flange; and
   wherein a grunt reed insert is positioned within the bore of the handle.

2. The rattle stick of claim 1 wherein the sleeve has two sections fitted together.

3. The rattle stick of claim 1 wherein the bore tapers outwardly within the flange.

4. The rattle stick of claim 1 wherein the handle has a compressible section that is operable to engage the grunt reed insert.

5. The rattle stick of claim 1 further comprising a latching mechanism to maintain the sleeve in a stationary position.

* * * * *